United States Patent
Nabeshi et al.

(10) Patent No.: US 11,414,124 B2
(45) Date of Patent: Aug. 16, 2022

(54) POWER CONVERSION APPARATUS, MOTOR DRIVING UNIT, AND ELECTRIC POWER STEERING APPARATUS

(71) Applicant: Nidec Corporation, Kyoto (JP)

(72) Inventors: Kaori Nabeshi, Kyoto (JP); Takashi Kitamura, Kyoto (JP)

(73) Assignee: Nidec Corporation, Kyoto (JP)

( * ) Notice: Subject to any disclaimer, the term of this patent is extended or adjusted under 35 U.S.C. 154(b) by 370 days.

(21) Appl. No.: 16/637,779

(22) PCT Filed: Jun. 28, 2018

(86) PCT No.: PCT/JP2018/024560
§ 371 (c)(1),
(2) Date: Feb. 10, 2020

(87) PCT Pub. No.: WO2019/064766
PCT Pub. Date: Apr. 4, 2019

(65) Prior Publication Data
US 2020/0216113 A1 Jul. 9, 2020

(30) Foreign Application Priority Data

Sep. 29, 2017 (JP) .............................. JP2017-189595

(51) Int. Cl.
*B62D 5/04* (2006.01)
*H02P 25/22* (2006.01)
*H02P 27/06* (2006.01)

(52) U.S. Cl.
CPC ............ *B62D 5/0463* (2013.01); *H02P 25/22* (2013.01); *H02P 27/06* (2013.01)

(58) Field of Classification Search
CPC ........ B62D 5/0463; H02P 25/22; H02P 27/06
See application file for complete search history.

(56) References Cited

U.S. PATENT DOCUMENTS

| | | | |
|---|---|---|---|
| 8,446,118 B2 | 5/2013 | Kinugasa et al. | |
| 2018/0175779 A1* | 6/2018 | Koseki | H02H 7/1227 |
| 2019/0077450 A1* | 3/2019 | Sasaki | H02P 25/22 |
| 2020/0220488 A1* | 7/2020 | Mori | H02M 7/5387 |

FOREIGN PATENT DOCUMENTS

JP       2014-192950 A    10/2014

* cited by examiner

*Primary Examiner* — Zoheb S Imtiaz
(74) *Attorney, Agent, or Firm* — Keating & Bennett

(57) ABSTRACT

A power conversion apparatus converts power from a power supply to power to be supplied to a motor including windings for n phases where n is an integer equal to or greater than three. The power conversion apparatus includes a first inverter connected to one end of the winding for each phase of the motor, a second inverter connected to another end of the winding for each phase, and a control circuit to control an operation of each of the first and second inverters. The windings for the n phases include a winding for a first phase and a winding for a second phase, and the control circuit superimposes a correction wave to reduce an induced electric current induced in the winding for the second phase by passing electricity through the winding for the first phase on a fundamental wave to pass electricity through the winding for the second phase.

11 Claims, 8 Drawing Sheets

POWER CONVERSION APPARATUS, MOTOR DRIVING UNIT, AND ELECTRIC POWER STEERING APPARATUS

CROSS REFERENCE TO RELATED APPLICATIONS

This is a U.S. national stage of PCT Application No. PCT/JP2018/024560, filed on Jun. 28, 2018, and priority under 35 U.S.C. § 119(a) and 35 U.S.C. § 365(b) is claimed from Japanese Application No. 2017-189595, filed Sep. 29, 2017, the entire disclosures of each of which are hereby incorporated herein by reference.

1. FIELD OF THE INVENTION

The present disclosure relates to a power conversion apparatus that converts power from a power supply to power to be supplied to an electric motor, a motor driving unit, and an electric power steering apparatus.

2. BACKGROUND

An electric motor (hereinafter referred to simply as a "motor"), such as, for example, a brushless DC motor or an alternating-current synchronous motor, is generally driven by three-phase currents. A complicated control technique, such as, for example, vector control, is employed to accurately control the waveforms of the three-phase currents. In such a control technique, high-level mathematical computations are required, and a digital arithmetic circuit, such as, for example, a microcontroller, is used. The vector control technique is utilized in applications that involve significant fluctuations in motor load, for example, in fields of washing machines, power-assisted bicycles, electric scooters, electric power steering apparatuses, electric vehicles, industrial equipment, and so on.

A motor generally includes a rotor and a stator. In the rotor, for example, a plurality of permanent magnets are arranged along a circumferential direction thereof. The stator includes a plurality of windings. In a motor including a permanent magnet, torque ripple is generated between the permanent magnet and windings. There is a known technique of generating a ripple correction wave that is a sine wave opposite in phase to a sixth harmonic component of torque ripple, and superimposing the ripple correction wave on a fundamental wave. According to this known technique, the superimposition of the ripple correction wave on the fundamental wave leads to a reduction in the torque ripple.

In a field of in-vehicle equipment, an automobile-use electronic control unit (ECU: Electrical Control Unit) is used in a vehicle. The ECU includes a microcontroller, a power supply, an input/output circuit, an AD converter, a load drive circuit, a read-only memory (ROM), and so on. An electronic control system is constructed using the ECU as a core unit. For example, the ECU processes a signal from a sensor to control an actuator, such as, for example, a motor. More specifically, the ECU controls an inverter in a power conversion apparatus while monitoring the rotation speed and/or torque of the motor. Under control of the ECU, the power conversion apparatus converts driving power to be supplied to the motor.

Mechatronics motors in which a motor, a power conversion apparatus, and an ECU are integrated into a single unit have been developed in recent years. In particular, in the field of in-vehicle equipment, a high level of quality assurance is required from a safety standpoint. Accordingly, redundant design is often adopted to allow a safe operation to continue even when a failure of a part has occurred. As an example of the redundant design, providing two power conversion apparatuses for one motor has been under study. As another example, providing a backup microcontroller for a main microcontroller has been under study.

A known power conversion apparatus includes a control portion and two inverters, and converts power to be supplied to a three-phase motor. Each of the two inverters is connected to a power supply and a ground (hereinafter referred to as a "GND"). One of the inverters is connected to ends of windings for three phases of the motor, while the other inverter is connected to other ends of the windings for the three phases. Each inverter has a bridge circuit including three legs each of which includes a high-side switching element and a low-side switching element. The control portion switches motor control from normal-time control to abnormal-time control when a failure has been detected in the switching elements in the two inverters. In the abnormal-time control, for example, the switching elements of the inverter in which a failure of any switching element has occurred are turned on or off according to a predetermined rule to form a neutral point for the windings. Then, motor driving is continued using the other inverter that normally functions.

There has been a demand for a further improvement in motor drive control in an apparatus including two inverters as described above.

SUMMARY

A power conversion apparatus according to an example embodiment of the present disclosure is a power conversion apparatus that converts power from a power supply to power to be supplied to a motor including windings for n phases, where n is an integer equal to or greater than three, the power conversion apparatus including a first inverter connected to one end of the winding for each phase of the motor, a second inverter connected to another end of the winding for each phase, and a control circuit to control an operation of each of the first and second inverters. The windings for the n phases include a winding for a first phase and a winding for a second phase. The control circuit superimposes a correction wave to reduce an induced electric current induced in the winding for the second phase by passing electricity through the winding for the first phase on a fundamental wave to pass electricity through the winding for the second phase.

The above and other elements, features, steps, characteristics and advantages of the present disclosure will become more apparent from the following detailed description of the example embodiments with reference to the attached drawings.

DETAILED DESCRIPTION

Before example embodiments of the present disclosure are described, findings of the present inventors which form the basis of the present disclosure will be described.

In the course of studying power conversion apparatuses of an independent connection type including two inverters, the present inventors have found that, when electricity has been passed through a winding for one phase, unwanted induced electric currents are generated in windings for other phases through which electricity has not been passed even in the absence of a harmonic component of a permanent magnet. The present inventors have found out through an experiment that, when electricity has been passed through a winding for one phase in the case of the independent connection type, ripples having in-phase components are generated in windings for other phases through which electricity has not been passed.

Harmonics that are unwanted induced electric currents become zero-phase currents (i.e., in-phase currents), resulting in a zero-phase current loss (i.e., a copper loss), i.e., noise. It is therefore desirable that unwanted harmonics are reduced to minimize an influence on phases other than the phase through which electricity is passed.

Hereinafter, power conversion apparatuses, motor driving units, and electric power steering apparatuses according to example embodiments of the present disclosure will be described in detail with reference to the accompanying drawings. Note that more detailed descriptions than are necessary may be omitted. For example, detailed descriptions of already well-known matters and redundant descriptions of essentially identical features may be omitted. This is for the purposes of preventing the following description from becoming unnecessarily redundant, and of facilitating understanding by those skilled in the art.

Example embodiments of the present disclosure will be described herein using, as examples, power conversion apparatuses that convert power to be supplied to a three-phase motor including windings for three phases (a U phase, a V phase, and a W phase). Note, however, that power conversion apparatuses that convert power to be supplied to an n-phase motor including windings for n phases (where n is an integer equal to or greater than three), such as, for example, four phases or five phases, also fall within the scope of the present disclosure.

Figure 1:
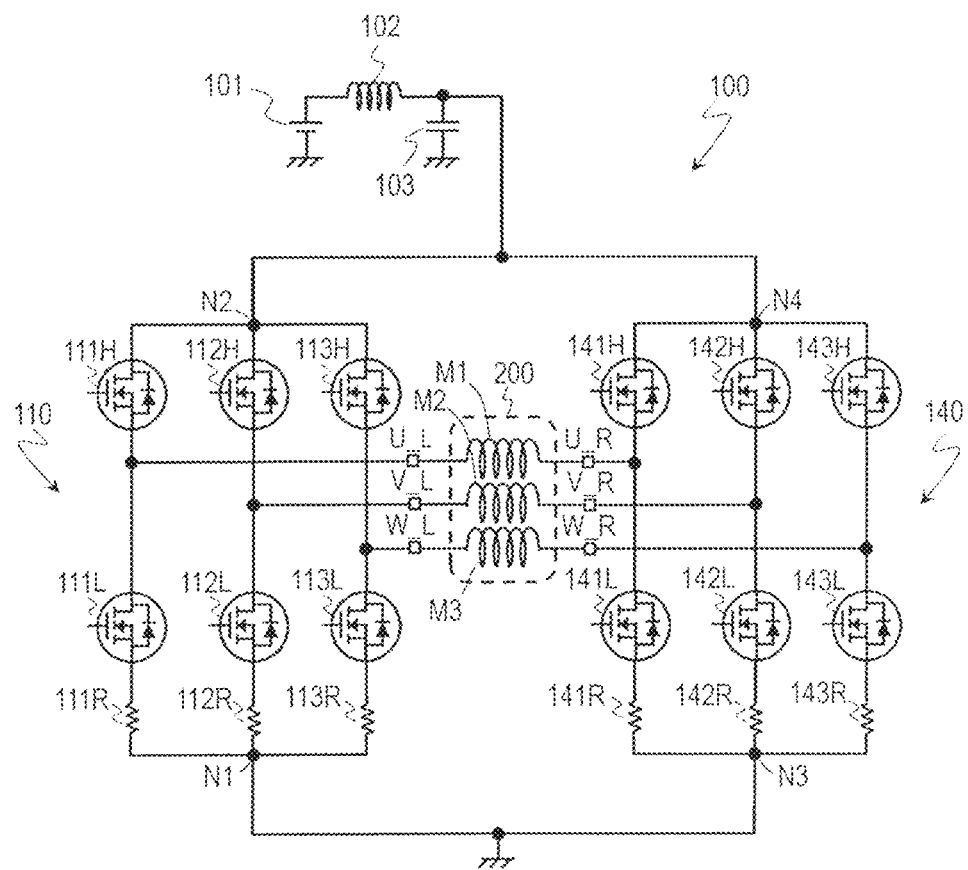
FIG. 1 is a schematic diagram illustrating a circuit configuration of a power conversion apparatus according to an example embodiment of the present disclosure.

FIG. 1 schematically illustrates the circuit configuration of a power conversion apparatus 100 according to an example embodiment of the present disclosure.

The power conversion apparatus 100 includes a first inverter 110 and a second inverter 140. In addition, the power conversion apparatus 100 includes a control circuit 300 illustrated in FIG. 5. The power conversion apparatus 100 is capable of converting power to be supplied to various motors. A motor 200 is, for example, a three-phase alternating-current motor.

The motor 200 includes a winding M1 for the U phase, a winding M2 for the V phase, and a winding M3 for the W phase, and is connected to each of the first inverter 110 and the second inverter 140. More specifically, the first inverter 110 is connected to ends of the windings for the respective phases of the motor 200, while the second inverter 140 is connected to other ends of the windings for the respective phases. It is assumed herein that "connection" between parts (constituent elements) primarily refers to electrical connection.

The first inverter 110 includes terminals U_L, V_L, and W_L for the respective phases, while the second inverter 140 includes terminals U_R, V_R, and W_R for the respective phases. The terminal U_L of the first inverter 110 is connected to one end of the winding M1 for the U phase, the terminal V_L is connected to one end of the winding M2 for the V phase, and the terminal W_L is connected to one end of the winding M3 for the W phase. As with the first inverter 110, the terminal U_R of the second inverter 140 is connected to the other end of the winding M1 for the U phase, the terminal V_R is connected to the other end of the winding M2 for the V phase, and the terminal W_R is connected to the other end of the winding M3 for the W phase. This form of connection is different from so-called star connection and so-called delta connection.

In the present specification, the first inverter 110 will sometimes be referred to as a "bridge circuit L". In addition, the second inverter 140 will sometimes be referred to as a "bridge circuit R". Each of the first inverter 110 and the second inverter 140 includes three legs each of which includes a low-side switching element and a high-side switching element. The switching elements defining these legs define a plurality of H bridges between the first inverter 110 and the second inverter 140 through the windings of the electric motor 200.

The first inverter 110 includes a bridge circuit made up of three legs. Switching elements 111L, 112L, and 113L illustrated in FIG. 1 are low-side switching elements, while switching elements 111H, 112H, and 113H are high-side switching elements. A field-effect transistor (typically, a MOSFET) or an insulated-gate bipolar transistor (IGBT), for example, can be used as each switching element. In the present specification, an example in which an FET is used as each of the switching elements of each inverter is described, and in the following description, each of the switching elements will sometimes be referred to as an FET. For example, the switching element 111L will be referred to as the FET 111L.

The first inverter 110 includes three shunt resistors 111R, 112R, and 113R for an electric current sensor 170 (see FIG. 5) for detecting electric currents flowing through the windings for the U phase, the V phase, and the W phase, respectively. The electric current sensor 170 includes an electric current detection circuit (not shown) that detects an electric current flowing through each shunt resistor. Each of the shunt resistors 111R, 112R, and 113R is connected, for example, between a GND and a corresponding one of the three low-side switching elements included in the three legs of the first inverter 110. Specifically, the shunt resistor 111R is connected between the FET 111L and the GND, the shunt resistor 112R is connected between the FET 112L and the GND, and the shunt resistor 113R is connected between the FET 113L and the GND. Each shunt resistor has a resistance value in the range of, for example, about 0.5 mΩ to about 1.0 mΩ.

Similarly to the first inverter 110, the second inverter 140 includes a bridge circuit made up of three legs. FETs 141L, 142L, and 143L illustrated in FIG. 1 are low-side switching elements, while FETs 141H, 142H, and 143H are high-side switching elements. In addition, the second inverter 140 includes three shunt resistors 141R, 142R, and 143R. Each of these shunt resistors is connected between the GND and a corresponding one of the three low-side switching elements included in the three legs. Each FET of each of the first and second inverters 110 and 140 can be controlled by, for example, a microcontroller or a dedicated driver.

Figure 2:
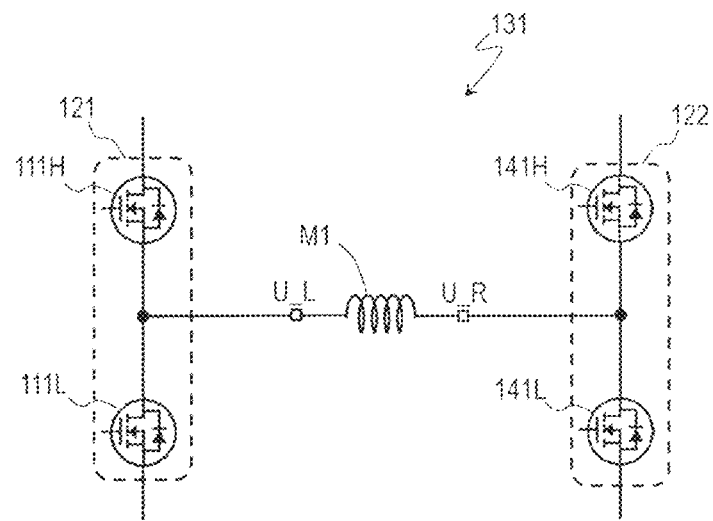
FIG. 2 is a diagram illustrating an H bridge included in a power conversion apparatus according to an example embodiment of the present disclosure.
Figure 3:
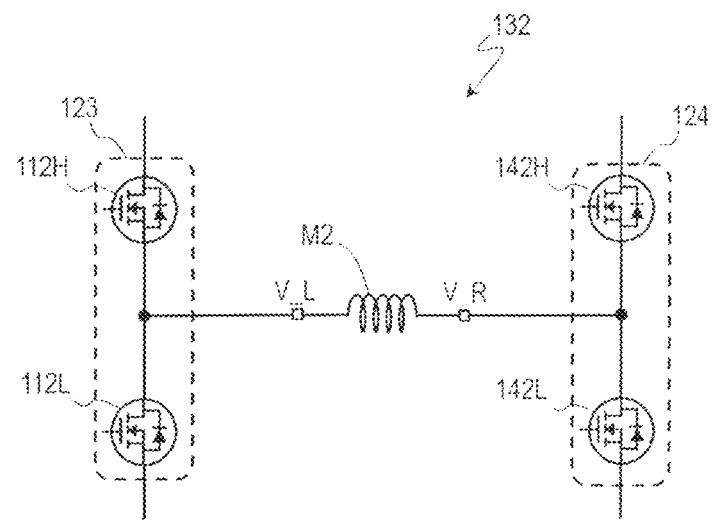
FIG. 3 is a diagram illustrating an H bridge included in a power conversion apparatus according to an example embodiment of the present disclosure.
Figure 4:
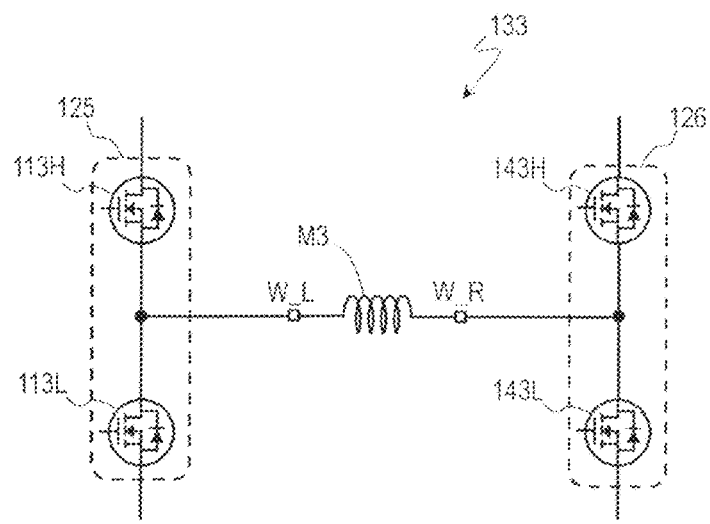
FIG. 4 is a diagram illustrating an H bridge included in a power conversion apparatus according to an example embodiment of the present disclosure.

FIGS. 2, 3, and 4 are diagrams illustrating three H bridges 131, 132, and 133, respectively, included in the power conversion apparatus 100.

The first inverter 110 includes legs 121, 123, and 125. The leg 121 includes the FET 111H and the FET 111L. The leg 123 includes the FET 112H and the FET 112L. The leg 125 includes the FET 113H and the FET 113L.

The second inverter 140 includes legs 122, 124, and 126. The leg 122 includes the FET 141H and the FET 141L. The leg 124 includes the FET 142H and the FET 142L. The leg 126 includes the FET 143H and the FET 143L.

The H bridge 131 illustrated in FIG. 2 includes the leg 121, the winding M1, and the leg 122. The H bridge 132 illustrated in FIG. 3 includes the leg 123, the winding M2, and the leg 124. The H bridge 133 illustrated in FIG. 4 includes the leg 125, the winding M3, and the leg 126.

A power supply 101 (see FIG. 1) generates a predetermined power supply voltage. Power is supplied from the power supply 101 to each of the first and second inverters 110 and 140. A direct-current power supply, for example, is used as the power supply 101. Note, however, that the power supply 101 may alternatively be an AC-DC converter, a DC-DC converter, or a battery (i.e., a storage battery). The power supply 101 may be a single power supply common to the first and second inverters 110 and 140, or alternatively, a first power supply used for the first inverter 110 and a second power supply used for the second inverter 140 may be provided.

A coil 102 is provided between the power supply 101 and the power conversion apparatus 100. The coil 102 functions as a noise filter, and smoothes high-frequency noise included in a voltage waveform supplied to each inverter, or smoothes high-frequency noise generated in each inverter to prevent the high-frequency noise from being discharged toward the power supply 101. In addition, one end of a capacitor 103 is connected between the power supply 101 and the power conversion apparatus 100. Another end of the capacitor 103 is connected to the GND. The capacitor 103 is a so-called bypass capacitor, and reduces voltage ripple. The capacitor 103 is, for example, an electrolytic capacitor, and the number of capacitors used and the capacitance of each capacitor are appropriately determined on the basis of design specifications and so on.

FIG. 1 illustrates an example configuration in which one shunt resistor is arranged in each leg of each inverter. The first and second inverters 110 and 140 may include six or less shunt resistors. The six or less shunt resistors may be connected between the GND and six or less of the low-side switching elements of the six legs included in the first and second inverters 110 and 140. To provide a generalization about an n-phase motor, the first and second inverters 110 and 140 may include 2n or less shunt resistors. The 2n or less shunt resistors may be connected between the GND and 2n or less of low-side switching elements of 2n legs included in the first and second inverters 110 and 140.

Figure 5:
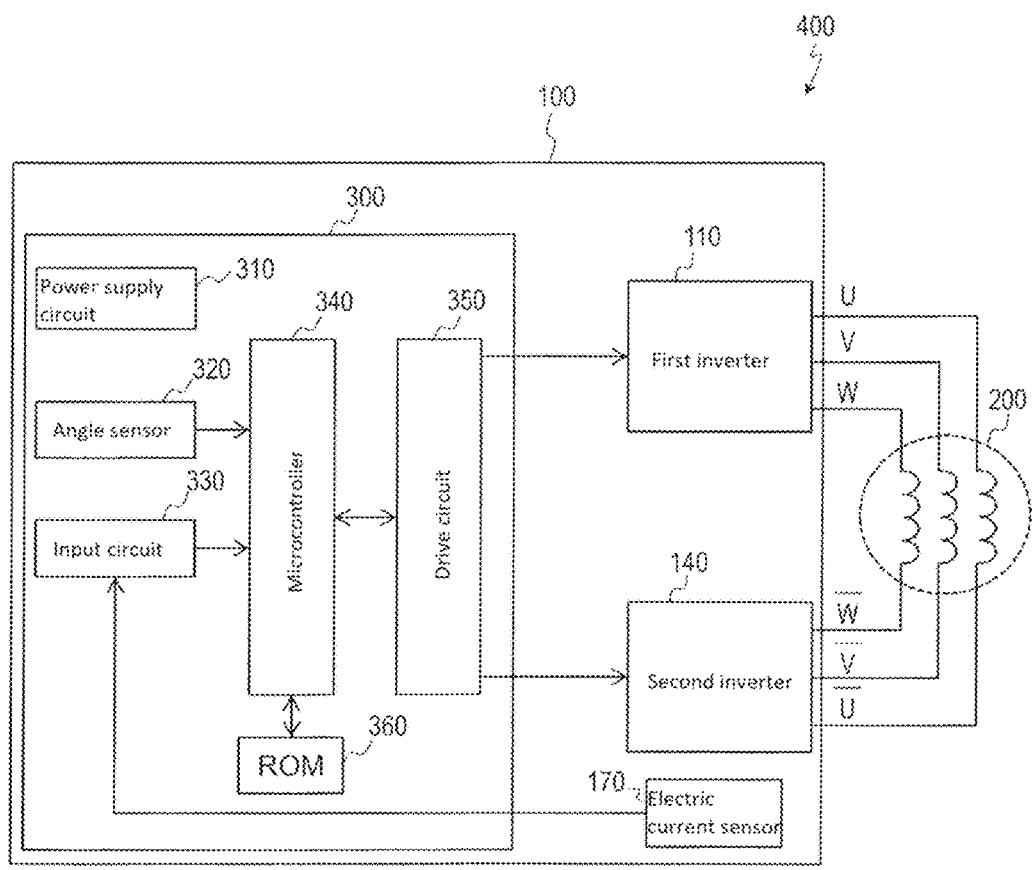
FIG. 5 is a block diagram illustrating a motor driving unit including a power conversion apparatus according to an example embodiment of the present disclosure.

FIG. 5 schematically illustrates the block structure of a motor driving unit 400 including the power conversion apparatus 100. The power conversion apparatus 100 includes the control circuit 300. The motor driving unit 400 includes the power conversion apparatus 100 and the motor 200.

The control circuit 300 includes, for example, a power supply circuit 310, an angle sensor 320, an input circuit 330, a microcontroller 340, a drive circuit 350, and a ROM 360. The control circuit 300 controls an overall operation of the power conversion apparatus 100 to drive the motor 200. Specifically, the control circuit 300 is able to realize closed loop control, controlling the position, rotation speed, electric currents, or the like of a target rotor. Note that the control circuit 300 may include a torque sensor in place of the angle sensor. In this case, the control circuit 300 will be able to control a target motor torque.

The power supply circuit 310 generates a DC voltage (e.g., 3 V or 5 V) necessary for each block in the circuit. The angle sensor 320 is, for example, a resolver or a Hall IC. A magnetoresistive sensor and a magnet may be used as the angle sensor 320. The angle sensor 320 detects a rotation angle (hereinafter referred to as a "rotation signal") of the rotor of the motor 200, and outputs the rotation signal to the microcontroller 340. The input circuit 330 receives the value of a motor electric current (hereinafter referred to as an "actual electric current value") detected by the electric current sensor 170, and, converting the level of the actual electric current value to an input level of the microcontroller 340 as necessary, outputs the actual electric current value to the microcontroller 340.

The microcontroller 340 controls a switching operation (i.e., turning on and off) of each of the FETs of the first inverter 110 and the second inverter 140. The microcontroller 340 generates a PWM signal, setting a target electric current value in accordance with the actual electric current value, the rotation signal of the rotor, or the like, and outputs the PWM signal to the drive circuit 350.

The drive circuit 350 is typically a gate driver. The drive circuit 350 generates a control signal (i.e., a gate control signal) for controlling the switching operation of each of the FETs in the first and second inverters 110 and 140 in accordance with the PWM signal, and provides the control signal to a gate of the FET. Note that the microcontroller 340 may be arranged to have the function of the drive circuit 350. In this case, the control circuit 300 may not include the drive circuit 350.

The ROM 360 is, for example, a writable memory, a rewritable memory, or a read-only memory. The ROM 360 has stored therein a control program including a collection of commands for causing the microcontroller 340 to control the power conversion apparatus 100. The control program is, for example, once loaded into a RAM (not shown) at a boot time.

Next, a specific example of a control method of the power conversion apparatus 100 will now be described below. The control circuit 300 drives the motor 200 by performing three-phase energization control using both the first and second inverters 110 and 140. Specifically, the control circuit 300 performs the three-phase energization control by controlling the switching of the FETs in the first inverter 110 and the FETs in the second inverter 140 in mutually opposite phases (phase difference=180°). For example, in the case of the H bridge including the FETs 111L, 111H, 141L, and 141H, the FET 141L is turned off when the FET 111L is turned on, and the FET 141L is turned on when the FET 111L is turned off. Similarly, the FET 141H is turned off when the FET 111H is turned on, and the FET 141H is turned on when the FET 111H is turned off. An electric current outputted from the power supply 101 flows to the GND through the high-side switching element, the winding, and the low-side switching element.

Here, a path of an electric current that flows through the winding M1 for the U phase will now be described below. When the FET 111H and the FET 141L are on, and the FET 141H and the FET 111L are off, the electric current flows from the power supply 101 to the GND through the FET 111H, the winding M1, and the FET 141L in the order named. When the FET 141H and the FET 111L are on, and the FET 111H and the FET 141L are off, the electric current flows from the power supply 101 to the GND through the FET 141H, the winding M1, and the FET 111L in the order named.

Next, a path of an electric current that flows through the winding M2 for the V phase will now be described below. When the FET 112H and the FET 142L are on, and the FET 142H and the FET 112L are off, the electric current flows from the power supply 101 to the GND through the FET 112H, the winding M2, and the FET 142L in the order named. When the FET 142H and the FET 112L are on, and the FET 112H and the FET 142L are off, the electric current flows from the power supply 101 to the GND through the FET 142H, the winding M2, and the FET 112L in the order named.

Next, a path of an electric current that flows through the winding M3 for the W phase will now be described below. When the FET 113H and the FET 143L are on, and the FET 143H and the FET 113L are off, the electric current flows from the power supply 101 to the GND through the FET 113H, the winding M3, and the FET 143L in the order named. When the FET 143H and the FET 113L are on, and the FET 113H and the FET 143L are off, the electric current flows from the power supply 101 to the GND through the FET 143H, the winding M3, and the FET 113L in the order named.

Figure 6:
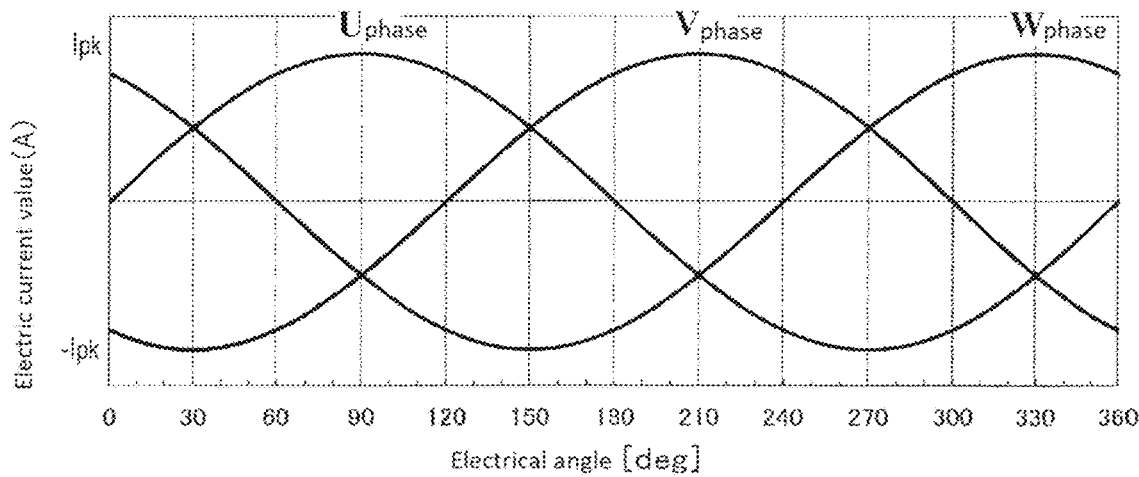
FIG. 6 is a diagram illustrating electric current waveforms obtained by plotting values of electric currents flowing through windings for a U phase, a V phase, and a W phase of a motor when a power conversion apparatus is controlled in accordance with three-phase energization control according to an example embodiment of the present disclosure.

FIG. 6 illustrates electric current waveforms (i.e., sine waves) obtained by plotting values of electric currents flowing through the windings for the U phase, the V phase, and the W phase of the motor 200 when the power conversion apparatus 100 is controlled in accordance with the three-phase energization control. The horizontal axis represents the electrical angle (deg) of the motor, while the vertical axis represents the electric current value (A). In the electric current waveforms of FIG. 6, electric current values are plotted at intervals of an electrical angle of 30°. $I_{pk}$ represents a maximum electric current value (i.e., a peak current value) of each phase.

Table 1 shows the values of electric currents flowing through the terminals of the inverters at various electrical angles in the sine waves of FIG. 6. Specifically, Table 1 shows the values of electric currents flowing through the terminals U_L, V_L, and W_L of the first inverter 110 (i.e., the bridge circuit L) at intervals of an electrical angle of 30°, and the values of electric currents flowing through the terminals U_R, V_R, and W_R of the second inverter 140 (i.e., the bridge circuit R) at intervals of an electrical angle of 30°. Here, with respect to the bridge circuit L, a direction in which an electric current flows from any of the terminals in the bridge circuit L to the corresponding terminal in the bridge circuit R is defined as a positive direction. The direction of the electric currents shown in FIG. 6 follows this definition. Meanwhile, with respect to the bridge circuit R, a direction in which an electric current flows from any of the terminals in the bridge circuit R to the corresponding terminal in the bridge circuit L is defined as a positive direction. Accordingly, there is a phase difference of 180° between the electric current in the bridge circuit L and the electric current in the bridge circuit R. In Table 1, the magnitude of an electric current value $I_1$ is $(3^{1/2}/2)*I_{pk}$, and the magnitude of an electric current value $I_2$ is $I_{pk}/2$.

TABLE 1

| | | Electrical Angle [deg] | | | | | | | | | | | |
|---|---|---|---|---|---|---|---|---|---|---|---|---|---|
| Normal-time Operation | | 0 (360) | 30 | 60 | 90 | 120 | 150 | 180 | 210 | 240 | 270 | 300 | 330 |
| Bridge circuit L | U_L phase | 0 | $I_2$ | $I_1$ | Ipk | $I_1$ | $I_2$ | 0 | $-I_2$ | $-I_1$ | $-Ipk$ | $-I_1$ | $-I_2$ |
| | V_L phase | $-I_1$ | $-Ipk$ | $-I_1$ | $-I_2$ | 0 | $I_2$ | $I_1$ | Ipk | $I_1$ | $I_2$ | 0 | $-I_2$ |
| | W_L phase | $I_1$ | $I_2$ | 0 | $-I_2$ | $-I_1$ | $-Ipk$ | $-I_1$ | $-I_2$ | 0 | $I_2$ | $I_1$ | Ipk |
| Bridge circuit R | U_R phase | 0 | $-I_2$ | $-I_1$ | $-Ipk$ | $-I_1$ | $-I_2$ | 0 | $I_2$ | $I_2$ | Ipk | $I_1$ | $I_2$ |

TABLE 1-continued

| Normal-time Operation | Electrical Angle [deg] | | | | | | | | | | | |
|---|---|---|---|---|---|---|---|---|---|---|---|---|
| | 0 (360) | 30 | 60 | 90 | 120 | 150 | 180 | 210 | 240 | 270 | 300 | 330 |
| V_R phase | $I_1$ | Ipk | $I_1$ | $I_2$ | 0 | $-I_2$ | $-I_1$ | -Ipk | $-I_1$ | $-I_2$ | 0 | $I_2$ |
| W_R phase | $-I_1$ | $-I_2$ | 0 | $I_2$ | $I_1$ | Ipk | $I_1$ | $I_2$ | 0 | $-I_2$ | $-I_1$ | -Ipk |

At an electrical angle of 0°, no electric current flows through the winding M1 for the U phase. An electric current having a magnitude of $I_1$ flows through the winding M2 for the V phase from the bridge circuit R to the bridge circuit L, and an electric current having a magnitude of $I_1$ flows through the winding M3 for the W phase from the bridge circuit L to the bridge circuit R.

At an electrical angle of 30°, an electric current having a magnitude of $I_2$ flows through the winding M1 for the U phase from the bridge circuit L to the bridge circuit R, an electric current having a magnitude of $I_{pk}$ flows through the winding M2 for the V phase from the bridge circuit R to the bridge circuit L, and an electric current having a magnitude of $I_2$ flows through the winding M3 for the W phase from the bridge circuit L to the bridge circuit R.

At an electrical angle of 60°, an electric current having a magnitude of $I_1$ flows through the winding M1 for the U phase from the bridge circuit L to the bridge circuit R, and an electric current having a magnitude of $I_1$ flows through the winding M2 for the V phase from the bridge circuit R to the bridge circuit L. No electric current flows through the winding M3 for the W phase.

At an electrical angle of 90°, an electric current having a magnitude of $I_{pk}$ flows through the winding M1 for the U phase from the bridge circuit L to the bridge circuit R, an electric current having a magnitude of $I_2$ flows through the winding M2 for the V phase from the bridge circuit R to the bridge circuit L, and an electric current having a magnitude of $I_2$ flows through the winding M3 for the W phase from the bridge circuit R to the bridge circuit L.

At an electrical angle of 120°, an electric current having a magnitude of $I_1$ flows through the winding M1 for the U phase from the bridge circuit L to the bridge circuit R, and an electric current having a magnitude of $I_1$ flows through the winding M3 for the W phase from the bridge circuit R to the bridge circuit L. No electric current flows through the winding M2 for the V phase.

At an electrical angle of 150°, an electric current having a magnitude of $I_2$ flows through the winding M1 for the U phase from the bridge circuit L to the bridge circuit R, an electric current having a magnitude of $I_2$ flows through the winding M2 for the V phase from the bridge circuit L to the bridge circuit R, and an electric current having a magnitude of $I_{pk}$ flows through the winding M3 for the W phase from the bridge circuit R to the bridge circuit L.

At an electrical angle of 180°, no electric current flows through the winding M1 for the U phase. An electric current having a magnitude of $I_1$ flows through the winding M2 for the V phase from the bridge circuit L to the bridge circuit R, and an electric current having a magnitude of $I_1$ flows through the winding M3 for the W phase from the bridge circuit R to the bridge circuit L.

At an electrical angle of 210°, an electric current having a magnitude of $I_2$ flows through the winding M1 for the U phase from the bridge circuit R to the bridge circuit L, an electric current having a magnitude of $I_{pk}$ flows through the winding M2 for the V phase from the bridge circuit L to the bridge circuit R, and an electric current having a magnitude of $I_2$ flows through the winding M3 for the W phase from the bridge circuit R to the bridge circuit L.

At an electrical angle of 240°, an electric current having a magnitude of $I_1$ flows through the winding M1 for the U phase from the bridge circuit R to the bridge circuit L, and an electric current having a magnitude of $I_1$ flows through the winding M2 for the V phase from the bridge circuit L to the bridge circuit R. No electric current flows through the winding M3 for the W phase.

At an electrical angle of 270°, an electric current having a magnitude of $I_{pk}$ flows through the winding M1 for the U phase from the bridge circuit R to the bridge circuit L, an electric current having a magnitude of $I_2$ flows through the winding M2 for the V phase from the bridge circuit L to the bridge circuit R, and an electric current having a magnitude of $I_2$ flows through the winding M3 for the W phase from the bridge circuit L to the bridge circuit R.

At an electrical angle of 300°, an electric current having a magnitude of $I_1$ flows through the winding M1 for the U phase from the bridge circuit R to the bridge circuit L, and an electric current having a magnitude of $I_1$ flows through the winding M3 for the W phase from the bridge circuit L to the bridge circuit R. No electric current flows through the winding M2 for the V phase.

At an electrical angle of 330°, an electric current having a magnitude of $I_2$ flows through the winding M1 for the U phase from the bridge circuit R to the bridge circuit L, an electric current having a magnitude of $I_2$ flows through the winding M2 for the V phase from the bridge circuit R to the bridge circuit L, and an electric current having a magnitude of $I_{pk}$ flows through the winding M3 for the W phase from the bridge circuit L to the bridge circuit R.

The control circuit 300, for example, controls the switching operation of each of the FETs in the bridge circuits L and R through PWM control such that the electric current waveforms illustrated in FIG. 6 are obtained.

As mentioned above, in the power conversion apparatus 100 including the two inverters 110 and 140, which is of an independent connection type, passing electricity through the winding for one of the phases generates induced electric currents in the windings for the other phases through which electricity has not been passed. In the present example embodiment, as a control method for reducing the induced electric current to be generated in any other phase than the phase through which electricity is passed, a waveform opposite in phase to the induced electric current to be generated is superimposed on a fundamental wave. This leads to a reduction in the generated induced electric current, which leads to noise. This in turn leads to a reduction in torque ripple or the like caused by the induced electric current.

For example, the microcontroller 340 issues an instruction to superimpose a correction wave for reducing an induced electric current to be induced in the winding M2 for the V phase by passing of electricity through the winding M1 for the U phase on a fundamental wave for passing of electricity through the winding M2 for the V phase. In addition, the microcontroller 340 issues an instruction to superimpose a correction wave for reducing an induced electric current to be induced in the winding M3 for the W phase by the passing of electricity through the winding M1 for the U phase on a fundamental wave for passing of electricity through the winding M3 for the W phase. This leads to a reduction in the induced electric current to be induced in each of the winding M2 for the V phase and the winding M3 for the W phase by the passing of electricity through the winding M1 for the U phase.

Figure 7:
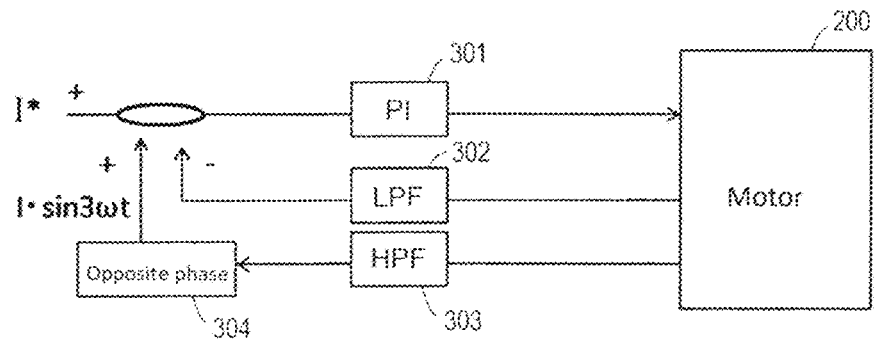
FIG. 7 is a block diagram illustrating an example of a process of reducing an induced electric current according to an example embodiment of the present disclosure.

FIG. 7 illustrates example functional blocks of the microcontroller 340 for performing a process of reducing the induced electric current. Blocks in functional block diagrams attached hereto are not hardware units but functional blocks. Software used in the process of reducing the induced electric current may be, for example, a module forming a computer program for causing specific processes corresponding to the respective functional blocks to be performed. Such a computer program is stored in, for example, the ROM 360. The microcontroller 340 is capable of reading commands from the ROM 360 to perform various processes as necessary. The process of reducing the induced electric current may be implemented in either hardware or software. Alternatively, the process of reducing the induced electric current may be implemented in a combination of hardware and software.

In an example illustrated in FIG. 7, the microcontroller 340 extracts a component corresponding to an induced electric current generated in the winding for each phase from an electric current detected by the electric current sensor 170. The microcontroller 340 computes a correction wave that is opposite in phase to the extracted induced electric current. Then, the microcontroller 340 issues an instruction to superimpose the computed correction wave on the fundamental wave to achieve a reduction in the induced electric current.

For example, when electricity is passed through the winding M1 for the U phase, the microcontroller 340 acquires, from the electric current sensor 170, values of electric currents that flow through the winding M2 for the V phase and the winding M3 for the W phase.

Each of the electric currents fed back is passed through a low-pass filter (LPF) 302 for normal motor drive, and then, a differential between a resultant and an electric current command value I* is obtained to be subjected to PI control (proportional-integral-differential control) 301 or the like.

In addition to the above feedback process for the electric current command value, each of the electric currents fed back is passed through a high-pass filter (HPF) 303. The high-pass filter 303 allows, for example, a third harmonic component having a frequency three times the frequency of the fundamental wave to pass therethrough. The electric current component that has passed through the high-pass filter 303 is converted to a waveform in an opposite phase in an opposite phase computation block 304. This wave in the opposite phase is used as the correction wave. An electric current of the correction wave in the opposite phase is superimposed on the electric current command value I*, and a resultant is used as a command value for the motor 200. The drive circuit 350 controls the inverters 110 and 140 in accordance with such command values to pass electricity through each of the winding M2 for the V phase and the winding M3 for the W phase. A reduction in the induced electric current generated in each of the phases other than the U phase, i.e., the V phase and the W phase, can be achieved by the electric current in the opposite phase. Note that a band-pass filter may be used in place of the high-pass filter.

Figure 8:
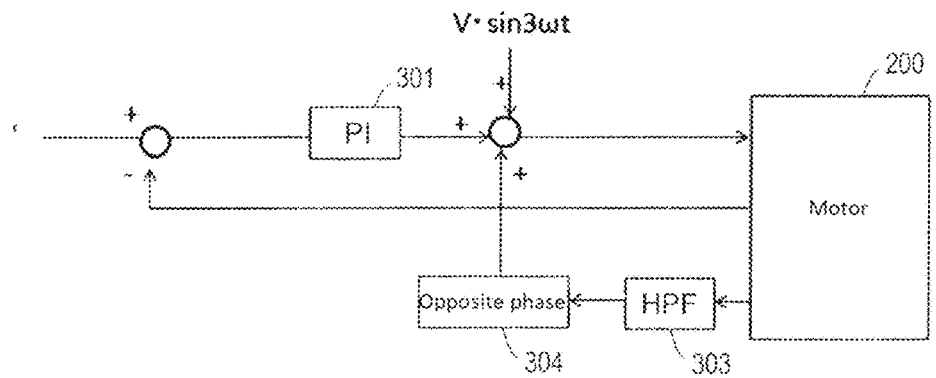
FIG. 8 is a block diagram illustrating another example of the process of reducing an induced electric current according to an example embodiment of the present disclosure.

In the example illustrated in FIG. 7, the electric current component opposite in phase to the induced electric current is superimposed on the electric current command value I*, but alternatively, a voltage component in an opposite phase may be superimposed on a voltage command value. For example, as illustrated in FIG. 8, such a voltage component may be superimposed on an output from a PI control block 301, i.e., a voltage command value for the inverters 110 and 140.

Figure 9:
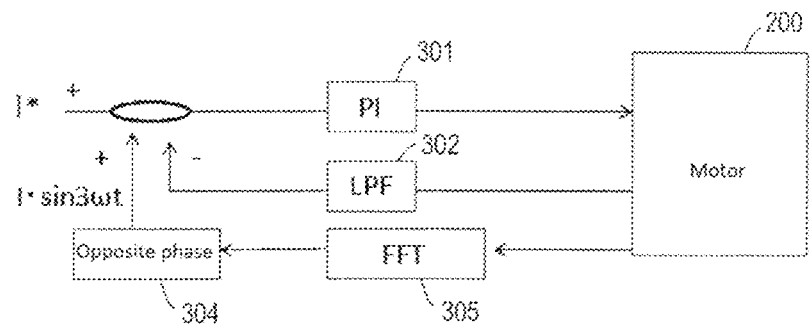
FIG. 9 is a block diagram illustrating yet another example of the process of reducing an induced electric current according to an example embodiment of the present disclosure.
Figure 10:
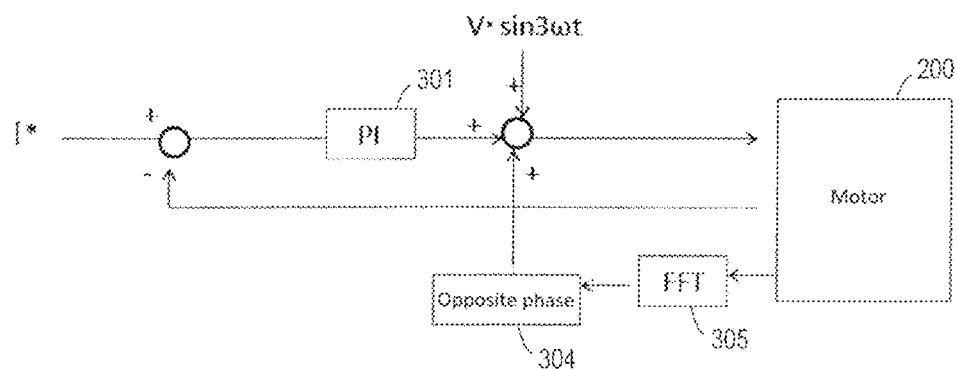
FIG. 10 is a block diagram illustrating yet another example of the process of reducing an induced electric current according to an example embodiment of the present disclosure.

In addition, as illustrated in each of FIGS. 9 and 10, a frequency band to be reversed in phase may be extracted in an FFT (fast Fourier transform) 305 instead of using the high-pass filter 303. In the case where the band-pass filter or the high-pass filter is used, a slight displacement in the frequency band of an electric current to be extracted for feedback might result in a failure to extract an electric current in a predetermined frequency band. Meanwhile, in the case where the FFT is used, a slight displacement in the frequency band of an electric current to be extracted would allow an electric current in a predetermined frequency band to be extracted.

Figure 11:
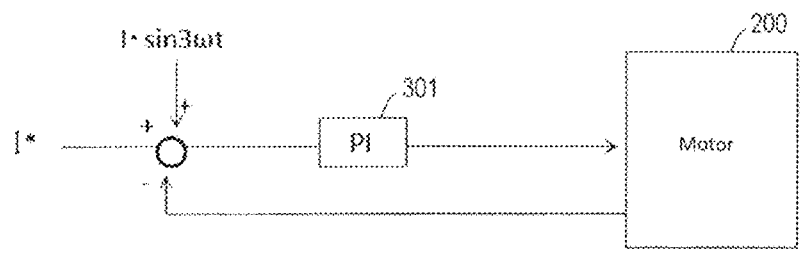
FIG. 11 is a block diagram illustrating yet another example of the process of reducing an induced electric current according to an example embodiment of the present disclosure.
Figure 12:
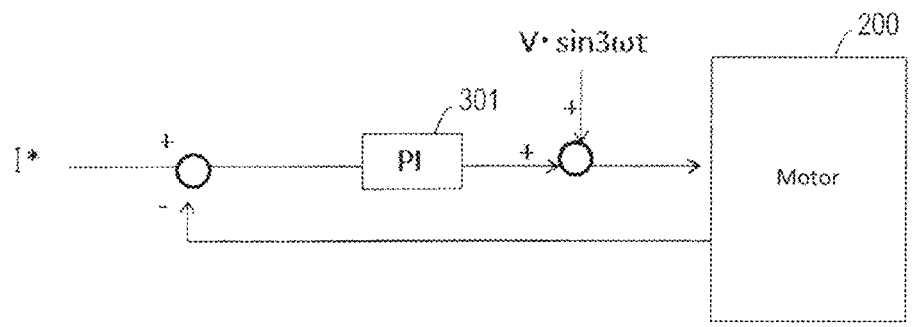
FIG. 12 is a block diagram illustrating yet another example of the process of reducing an induced electric current according to an example embodiment of the present disclosure.

Next, another example of the process of reducing the induced electric current will now be described below. Each of FIGS. 11 and 12 illustrates example functional blocks of the microcontroller 340 for performing the process of reducing the induced electric current. In this example, the process of reducing the induced electric current is performed using a look-up table indicating relationships between passing of electricity through the windings and induced electric currents to be induced thereby. This look-up table is stored in, for example, the ROM 360 in advance.

The look-up table indicates, for example, a relationship between an electric current to be supplied to the winding M1 for the U phase and an induced electric current to be induced in each of the winding M2 for the V phase and the winding M3 for the W phase by the passing of electricity through the winding M1 for the U phase. In addition, the look-up table indicates, for example, a relationship between an electric current to be supplied to the winding M2 for the V phase and an induced electric current to be induced in each of the winding M3 for the W phase and the winding M1 for the U phase by the passing of electricity through the winding M2 for the V phase. In addition, the look-up table indicates, for example, a relationship between an electric current to be supplied to the winding M3 for the W phase and an induced electric current to be induced in each of the winding M1 for the U phase and the winding M2 for the V phase by the passing of electricity through the winding M3 for the W phase. The microcontroller 340 computes a correction wave opposite in phase to the induced electric current acquired using the table. The microcontroller 340 issues an instruction to superimpose the computed correction wave on a fundamental wave for passing electricity through the winding.

Alternatively, the look-up table may indicate relationships between passing of electricity through the windings and correction waves for reducing induced electric currents to be induced thereby. In this case, for example, the microcontroller 340 acquires, from the look-up table, correction waves for reducing induced electric currents to be induced in the winding M2 for the V phase and the winding M3 for the W phase by the passing of electricity through the winding M1 for the U phase. Then, the microcontroller 340 issues an instruction to superimpose the correction waves acquired using the table on fundamental waves for passing electricity through the winding M2 for the V phase and the winding M3 for the W phase, respectively.

In each of the examples illustrated in FIGS. 7 to 10, the waveform opposite in phase to the induced electric current, which leads to noise, is computed for the value fed back, and an electric current or voltage having this waveform is superimposed on the fundamental wave. In contrast, in each of the examples illustrated in FIGS. 11 and 12, a reduction in the induced electric current is achieved through feedforward control. The look-up table stores the waveforms of the induced electric currents to be generated or the waveforms opposite in phase thereto in advance. The microcontroller 340 causes an electric current or voltage having a reverse waveform acquired using the look-up table to be superimposed on a command value.

A reduction in the induced electric current generated in each of the phases other than the phase through which electricity is passed can be achieved by superimposing an electric current or voltage in an opposite phase on the fundamental wave. This leads to a reduction in torque ripple or the like generated by the induced electric current.

Note that the look-up table as described above may be used in each of the example processes illustrated using FIGS. 7 to 10. For example, when electricity is passed through the winding M1 for the U phase, the microcontroller 340 acquires, from the electric current sensor 170, the values of the electric currents that flow through the winding M2 for the V phase and the winding M3 for the W phase. A component corresponding to the induced electric current is extracted from each of the electric currents fed back.

The look-up table indicates a relationship between an induced electric current to be induced in each of the winding M2 for the V phase and the winding M3 for the W phase by the passing of electricity through the winding M1 for the U phase and a correction wave for reducing the induced electric current. The microcontroller 340 acquires correction waves for reducing the respective extracted induced electric currents using the look-up table. The microcontroller 340 superimposes the acquired correction waves on the fundamental waves for passing electricity through the winding M2 for the V phase and the winding M3 for the W phase, respectively. This leads to reductions in the induced electric currents.

In each of the above examples, a harmonic is superimposed on an electric current command value or a voltage command value along a z-axis. The technique of the present disclosure is also applicable to a dq-axis control system without an addition of the z-axis. In this case, reductions in the induced electric currents can be achieved by injecting an arbitrary in-phase sine wave into all phases after dq inverse transformation. Vector control in which computations are performed on dq axes is in common use, and there are many motors that have a circuit configuration and a control algorithm suited thereto. Meanwhile, in the case where the z-axis is taken into account, a circuit that is different in circuit configuration or the like from a normal circuit may be required, and significant changes in circuit design may be required. In contrast, in the case of the configuration in which the superimposition of a harmonic is performed on the dq axes, significant circuit changes or the like are not required.

Note that waveforms of the electric current and the voltage to be superimposed may be of any desirable type that allows appropriate phase adjustment, such as, for example, a sine wave, a triangle wave, a sawtooth wave, or a square wave.

Figure 13:
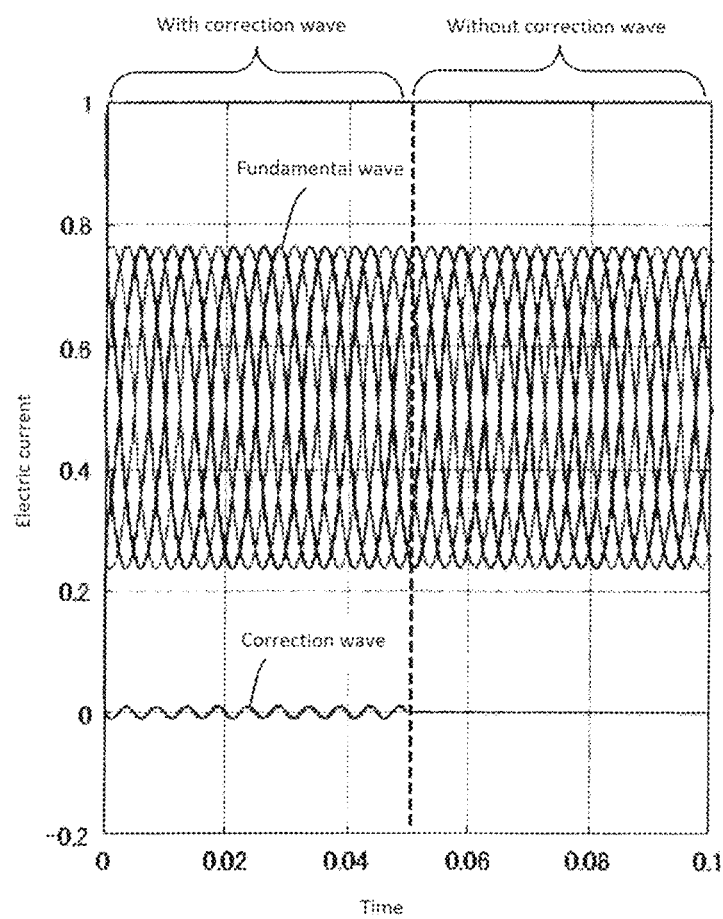
FIG. 13 is a diagram illustrating a result of a simulation of the process of reducing an induced electric current according to an example embodiment of the present disclosure.
Figure 14:
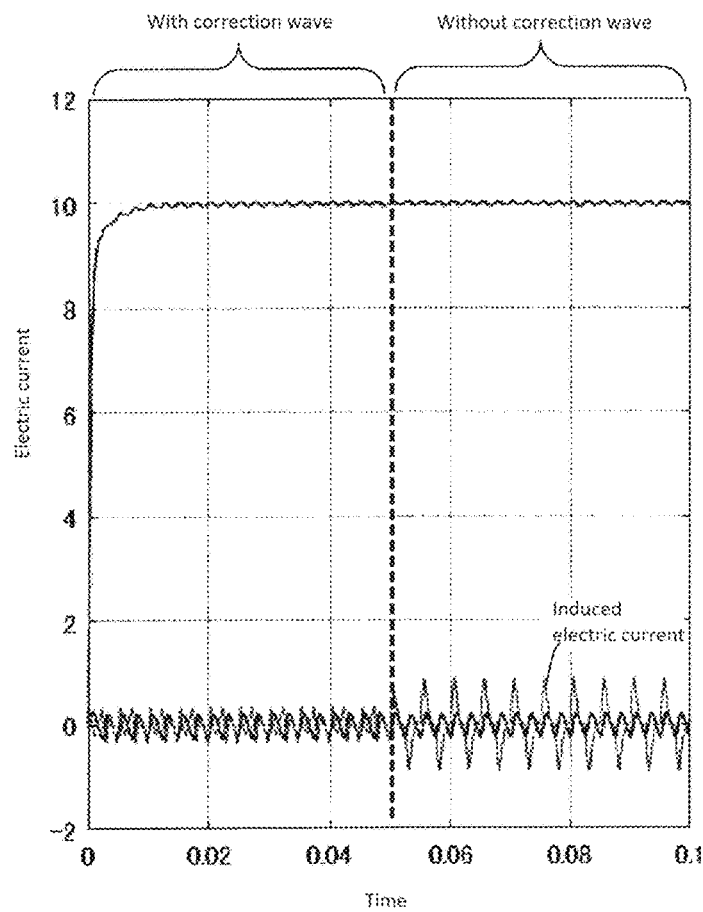
FIG. 14 is a diagram illustrating the result of the simulation of the process of reducing an induced electric current according to an example embodiment of the present disclosure.

FIGS. 13 and 14 show a result of a simulation using the technique of the present disclosure. In each of FIGS. 13 and 14, the vertical axis represents electric current, while the horizontal axis represents time. On the left-hand side in FIG. 13, a correction wave to be superimposed on a fundamental wave is shown. On the left-hand side in FIG. 14, an induced electric current generated when the correction wave has been superimposed on the fundamental wave is shown. On the right-hand side in FIG. 14, an induced electric current generated when the correction wave is not superimposed on the fundamental wave is shown. It is apparent from the result shown in FIG. 14 that the superimposition of the correction wave on the fundamental wave leads to a reduction in the induced electric current.

Figure 15:
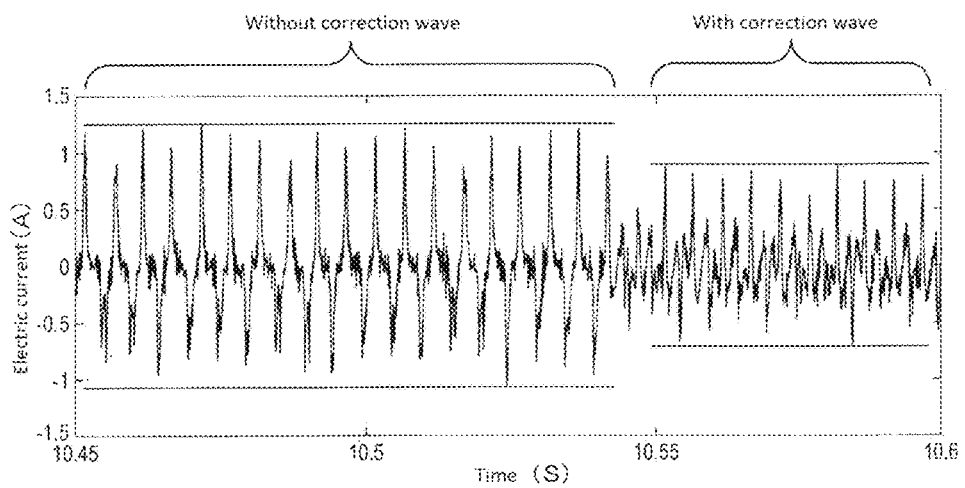
FIG. 15 is a diagram illustrating induced electric currents generated when electricity has been passed through a motor according to an example embodiment of the present disclosure.

FIG. 15 shows induced electric currents generated when electricity has been passed through an actual motor. In FIG. 15, the vertical axis represents electric current, while the horizontal axis represents time. On the left-hand side in FIG. 15, an induced electric current generated when a correction wave is not superimposed on a fundamental wave is shown. On the right-hand side in FIG. 15, an induced electric current generated when a correction wave has been superimposed on a fundamental wave is shown. It is apparent from the result shown in FIG. 15 that the superimposition of the correction wave on the fundamental wave leads to a reduction in the induced electric current.

A vehicle such as an automobile or the like generally includes an electric power steering apparatus. The electric power steering apparatus generates an assistive torque for assisting a steering wheel torque of a steering system which is generated by a driver operating a steering wheel. The assistive torque is generated by an assistive torque mechanism to reduce an operational burden on the driver. The assistive torque mechanism includes, for example, a steering wheel torque sensor, an ECU, a motor, a speed reduction mechanism, and so on. The steering wheel torque sensor detects a steering wheel torque in the steering system. The ECU generates a drive signal on the basis of a detection signal obtained by the steering wheel torque sensor. The motor generates an assistive torque that matches the steering wheel torque on the basis of the drive signal, and transfers the assistive torque to the steering system through the speed reduction mechanism.

Figure 16:
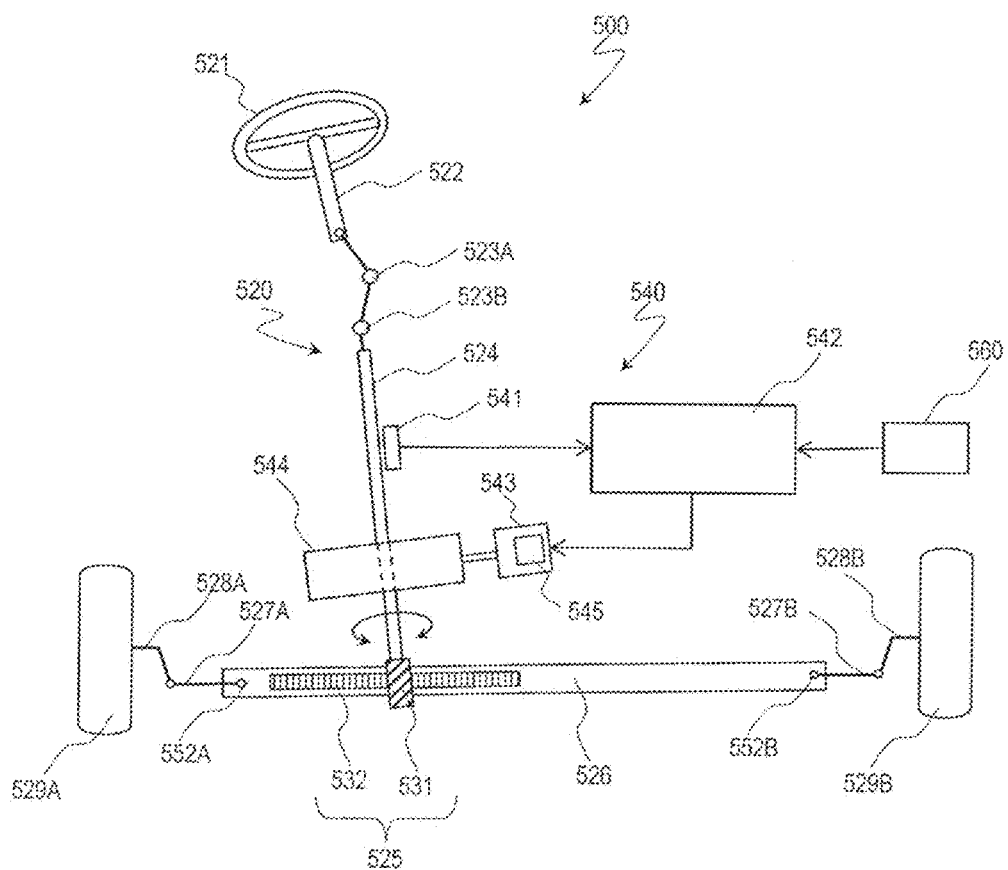
FIG. 16 is a schematic diagram illustrating an electric power steering apparatus according to an example embodiment of the present disclosure.

The motor driving unit 400 according to an example embodiment of the present disclosure can be suitably used in an electric power steering apparatus. FIG. 16 schematically illustrates an electric power steering apparatus 500 according to the present example embodiment. The electric power steering apparatus 500 includes a steering system 520 and an assistive torque mechanism 540.

The steering system 520 includes, for example, a steering wheel 521, a steering shaft 522 (referred to also as a "steering column"), flexible shaft couplings 523A and 523B, a rotating shaft 524 (referred to also as a "pinion shaft" or an "input shaft"), a rack-and-pinion mechanism 525, a rack shaft 526, left and right ball joints 552A and 552B, tie rods 527A and 527B, knuckles 528A and 528B, and left and right steerable wheels (e.g., left and right front wheels) 529A and 529B. The steering wheel 521 is coupled to the rotating shaft 524 through the steering shaft 522 and the flexible shaft couplings 523A and 523B. The rack shaft 526 is coupled to the rotating shaft 524 through the rack-and-pinion mechanism 525. The rack-and-pinion mechanism 525 includes a pinion 531 arranged on the rotating shaft 524, and a rack 532 arranged on the rack shaft 526. At an end of the rack shaft 526 on the right side, the right steerable wheel 529A is coupled to the rack shaft 526 through the knuckle 528A, the tie rod 527A, and the ball joint 552A arranged in the order named. As with the right side, at an end of the rack shaft 526 on the left side, the left steerable wheel 529B is coupled to the rack shaft 526 through the knuckle 528B, the tie rod 527B, and the ball joint 552B arranged in the order named. Here, the right side and the left side correspond to a right side a left side, respectively, as viewed from the driver sitting in a seat.

In the steering system 520, a steering wheel torque is generated by the driver operating the steering wheel 521, and is transferred to the left and right steerable wheels 529A and 529B through the rack-and-pinion mechanism 525. The driver is thus able to operate the left and right steerable wheels 529A and 529B.

The assistive torque mechanism 540 includes, for example, a steering wheel torque sensor 541, an ECU 542, a motor 543, a speed reduction mechanism 544, and a power conversion apparatus 545. The assistive torque mechanism 540 provides an assistive torque to the steering system 520, which has the steering wheel 521 at one end and each of the left and right steerable wheels 529A and 529B at an opposite end. Note that the assistive torque may be referred to as an "additional torque".

The control circuit 300 according to an example embodiment of the present disclosure can be used as the ECU 542, and the power conversion apparatus 100 according to an example embodiment of the present disclosure can be used as the power conversion apparatus 545. The motor 543 corresponds to the motor 200 in an example embodiment of the present disclosure. The motor driving unit 400 according to an example embodiment of the present disclosure can be suitably used as a mechatronics unit including the ECU 542, the motor 543, and the power conversion apparatus 545.

The steering wheel torque sensor 541 detects a steering wheel torque applied by the steering wheel 521 in the steering system 520. The ECU 542 generates a drive signal for driving the motor 543 on the basis of a detection signal (hereinafter referred to as a "torque signal") from the steering wheel torque sensor 541. The motor 543 generates an assistive torque that matches the steering wheel torque on the basis of the drive signal. The assistive torque is transferred to the rotating shaft 524 of the steering system 520 through the speed reduction mechanism 544. The speed reduction mechanism 544 is, for example, a worm gear mechanism. The assistive torque is further transferred from the rotating shaft 524 to the rack-and-pinion mechanism 525.

The electric power steering apparatus 500 can be classified as a pinion assist type, a rack assist type, a column assist type, or the like depending on where the assistive torque is applied to the steering system 520. In FIG. 16, the electric power steering apparatus 500 is depicted as being of the pinion assist type. Note that the electric power steering apparatus 500 may alternatively be of the rack assist type, the column assist type, or the like.

Not only the torque signal but also, for example, a vehicle speed signal may be inputted to the ECU 542. An external device 560 is, for example, a vehicle speed sensor. The external device 560 may alternatively be another ECU capable of communication via an in-vehicle network, such as, for example, a controller area network (CAN). A microcontroller of the ECU 542 is capable of controlling the motor 543 through, for example, vector control on the basis of, for example, the torque signal and the vehicle speed signal.

The ECU 542 sets a target electric current value on the basis of at least the torque signal. The ECU 542 preferably sets the target electric current value, taking into account a vehicle speed signal obtained by detection by the vehicle speed sensor and, additionally, the rotation signal of the rotor obtained by detection by the angle sensor 320. The ECU 542 is capable of controlling the drive signal for the motor 543, that is, an electric drive current for the motor 543, so that an actual electric current value detected by the electric current sensor 170 will coincide with the target electric current value.

The electric power steering apparatus 500 allows the left and right steerable wheels 529A and 529B to be controlled through the rack shaft 526 using a combination of the steering wheel torque applied by the driver and the assistive torque generated by the motor 543. In particular, when the motor driving unit 400 according to an example embodiment of the present disclosure is used as the aforementioned mechatronics unit, an electric power steering apparatus including a motor driving unit with improved qualities of parts and capable of appropriate electric current control under both normal and abnormal conditions is provided.

Example embodiments of the present disclosure have been described above. The foregoing description of the example embodiments has been provided by way of example, and is not meant to limit the scope of the technique of the present disclosure. In addition, features of the above-described example embodiments described in the foregoing description may be combined appropriately in other example embodiments of the present disclosure.

Example embodiments of the present disclosure are widely applicable to a variety of devices including various types of motors, such as, for example, a vacuum cleaner, a dryer, a ceiling fan, a washing machine, a refrigerator, and an electric power steering apparatus.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion apparatus that converts power from a power supply to power to be supplied to a motor including windings for n phases, where n is an integer equal to or greater than three, the power conversion apparatus comprising:
   a first inverter connected to one end of the winding for each phase of the motor;
   a second inverter connected to another end of the winding for each phase; and
   a control circuit to control an operation of each of the first and second inverters; wherein
   the windings for the n phases include a winding for a first phase and a winding for a second phase; and
   the control circuit superimposes a correction wave to reduce an induced electric current induced in the winding for the second phase to pass electricity through the winding for the first phase on a fundamental wave to pass electricity through the winding for the second phase.

2. The power conversion apparatus according to claim 1, wherein the correction wave includes an electric current component opposite in phase to the induced electric current induced in the winding for the second phase.

3. The power conversion apparatus according to claim 2, wherein the correction wave includes a voltage component opposite in phase to the induced electric current induced in the winding for the second phase.

4. The power conversion apparatus according to claim 1, further comprising a memory storing a table indicating a relationship between an electric current to be supplied to the winding for the first phase and an induced electric current to be induced in the winding for the second phase by the passing of electricity through the first phase; wherein the control circuit computes a correction wave opposite in phase to the induced electric current acquired using the table, and superimposes the computed correction wave on the fundamental wave to pass electricity through the winding for the second phase.

5. The power conversion apparatus according to claim 1, further comprising a memory storing a table indicating a relationship between an electric current to be supplied to the winding for the first phase and a correction wave to reduce an induced electric current to be induced in the winding for the second phase by the passing of electricity through the first phase; wherein the control circuit superimposes the correction wave acquired using the table on the fundamental wave to pass electricity through the winding for the second phase.

6. The power conversion apparatus according to claim 1, further comprising:

a memory storing a table indicating a relationship between an induced electric current to be induced in the winding for the second phase by passing electricity through the first phase and a correction wave to reduce the induced electric current; and an electric current sensor to detect an electric current flowing through the winding for the second phase; wherein the control circuit:

extracts a component corresponding to the induced electric current from the detected electric current;

acquires the correction wave to reduce the extracted induced electric current using the table; and superimposes the acquired correction wave on the fundamental wave to pass electricity through the winding for the second phase.

7. The power conversion apparatus according to claim 1, further comprising an electric current sensor to detect an electric current flowing through the winding for the second phase, wherein the control circuit:

extracts a component corresponding to the induced electric current from the detected electric current;

computes a correction wave opposite in phase to the extracted induced electric current; and superimposes the computed correction wave on the fundamental wave to pass electricity through the winding for the second phase.

8. The power conversion apparatus according to claim 1, wherein the windings for the n phases further include a winding for a third phase; and the control circuit superimposes a correction wave to reduce an induced electric current induced in the winding for the third phase by passing electricity through the winding for the first phase on a fundamental wave to pass electricity through the winding for the third phase.

9. The power conversion apparatus according to claim 1, wherein the windings for the n phases further include a winding for a third phase;

the first inverter includes first, second, and third low-side switches and first, second, and third high-side switches;

the second inverter includes fourth, fifth, and sixth low-side switches and fourth, fifth, and sixth high-side switches;

the first low-side switch and the first high-side switch of the first inverter are connected to one end of the winding for the first phase;

the second low-side switch and the second high-side switch of the first inverter are connected to one end of the winding for the second phase;

the third low-side switch and the third high-side switch of the first inverter are connected to one end of the winding for the third phase;

the fourth low-side switch and the fourth high-side switch of the second inverter are connected to another end of the winding for the first phase;

the fifth low-side switch and the fifth high-side switch of the second inverter are connected to another end of the winding for the second phase; and the sixth low-side switch and the sixth high-side switch of the second inverter are connected to another end of the winding for the third phase.

10. A motor driving unit comprising:
the power conversion apparatus of claim 1; and
a motor.

11. An electric power steering apparatus comprising the motor driving unit of claim 10.

* * * * *